United States Patent Office 3,075,026
Patented Jan. 22, 1963

3,075,026
POLYMERIZATION OF PROPYLENE OR BUTENES WITH VCl₄ CATALYST TO FORM LIQUID POLYMERS
Robert L. Banks, Bartlesville, Okla., assignor to Phillips Petroleum Company, a corporation of Delaware
No Drawing. Filed May 13, 1958, Ser. No. 734,855
8 Claims. (Cl. 260—683.15)

This invention relates to an olefin polymerization process. In another aspect it relates to a method of forming liquid polymer from mono-olefins having from 3 to 4 carbon atoms. In one of its more specific aspects this invention relates to a method of forming heavy liquid polymer by the liquid phase polymerization of propylene.

Heavy liquid hydrocarbons boiling above 400° F., generally in the range of about 425° to 650° F. can be obtained by polymerizing low molecular weight olefins such as propylene or butenes. Hydrocarbons of this type are useful as lubricants and can be employed as starting materials in the manufacture of detergents.

I have discovered that heavy liquid polymers of monoolefins having 3 to 4 carbon atoms per molecule can be formed by contacting the monomeric material with a catalyst consisting essentially of vanadium tetrachloride. By employing a vanadium tetrachloride catalsyt in admixture with a suitable diluent and a temperature in the range of about 100° to 300° F., propylene and/or butenes can be polymerized to a heavy liquid polymer boiling above 400° F.

It is an object of this invention to provide a method of polymerizing low molecular weight olefins.

It is another object to provide a method of obtaining a heavy liquid hydrocarbon suitable as a lubricant from propylene and/or butenes.

Still another object of my invention is to provide a convenient liquid phase polymerization process by which a liquid polymer of propylene, boiling between about 400° and 650° F., can be obtained.

Vanadium tetrachloride which is the sole active catalytic agent in my invention is a red liquid having a specific gravity at 30° C. of 1.816 and a boiling point of about 300° F. The catalyst is admixed with a suitable diluent which should be inert, non-deleterious and liquid under the polymerization conditions. Generally, hydrocarbon diluents are used which have boiling points below 400° F. so that they may be readily separated from the liquid polymer. Especially useful are the paraffins and cycloparaffins having from 3 to 12, preferably 5 to 12, carbon atoms per molecule. Examples of suitable diluents include propane, isobutane, normal pentane, isopentane, isooctane, methylcyclohexane, cyclohexane, and the like. Mixtures of these diluents can also be employed. Aromatic hydrocarbon diluents are operative although less preferred in many cases since aromatic hydrocarbons frequently require more expensive purification than do the non-aromatics.

The feed stock of my invention consists of propylene, 1-butene, 2-butene, isobutylene, or mixtures of these mono-olefins. The olefinic feed stock is added to the reaction mixture and sufficient pressure is employed so that the diluent and catalyst are maintained in the liquid phase and olefin not liquefied under the polymerization conditions is dissolved in the liquid phase in sufficient amount. This often requires a pressure of at least 100–300 pounds per square inch gauge, depending on the feed and temperature, but the pressure can range from atmospheric to 500–700 pounds per square inch, or even higher if desired. A preferred feed stock for my invention is propylene.

Since vanadium tetrachloride decomposes on contact with water, the feed stock and diluent should be substantially dry. It is desirable in some applications to install a dryer for the feed stock ahead of the reactor in order to insure that water will not be present in the reaction mixture. Minute amounts of water can be tolerated but this increases the consumption of catalyst.

The propylene and/or butene feed stock is contacted with the vanadium tetrachloride catalyst by any suitable mixing method. Centrifugal pumps, reactors equipped with stirrers, or other mixing devices available in the art can be employed. The mixing device should be such that intimate contact between the liquid catalyst and the olefin feed stock is provided.

The temperature of the polymerization is generally in the range of about 100° to 300° F. although I prefer to practice the polymerization at a temperature of about 150° to 250° F.

The ratio of olefin to diluent is generally in the range of about 1:1 to 1:20 on a weight basis. Preferably, from 2 to 10 parts by weight of diluent are employed for each part of olefin. The catalyst concentration based on the total polymerization mixture including the olefin and diluent is usually in the range of about 0.5 to 5 weight percent. Preferably from 1 to 5 weight percent of the reaction mixture is vanadium tetrachloride. The contact time between the vanadium tetrachloride catalyst and the olefin feed stock can cover a relatively broad range, generally from about 30 minutes to 10 hours or more. A contact time in the range of about 1 to 3 hours, however, is preferred.

When the polymerization is completed, the heavy liquid polymer can be separated from the polymerization mixture by distillation. The diluent and vanadium tetrachloride is distilled overhead, leaving the heavy polymer in the bottoms.

Advantages of this invention are illustrated by the following examples. The reactants, and their proportions, and other specific conditions are presented as being typical and should not be construed to limit the invention unduly.

*Example I*

Four liquid cubic centimeters of vanadium tetrachloride and 300 grams of cyclohexane were added to a one-liter stirred reactor. The stirrer was started and the reactor heated to 225° F. Propylene was added at a rate of 350 grams per hour until the reactor reached 290 p.s.i.g. (about 18 minutes). The reactor was heated for 5 hours at 225° F. and 290–300 p.s.i.g., and then the heater and stirrer were shut off. The next day the unreacted propylene, cyclohexane and polymer were removed from the reactor. Seventy-six grams of heavy liquid, boiling above 400° F., was recovered. The infrared spectrum showed that this heavy liquid was a propylene polymer. There was evidence that a small amount of adjacent dimethyl branching was present, arising from head-to-head polymerization.

*Example II*

A test was made with ethylene instead of propylene as described in Example I except the temperature was 290° F. and the pressure 450 p.s.i.g. No polymer was formed.

As will be evident to those skilled in the art, various modifications of this invention can be made, or followed, in the light of the foregoing disclosure and discussion, without departing from the spirit or scope thereof.

I claim:
1. A method of polymerizing monoolefins having from 3 to 4 carbon atoms per molecule comprising contacting said monoolefin with a catalyst consisting essentially of vanadium tetrachloride under polymerization conditions.
2. A method of forming a heavy liquid, hydrocarbon polymer comprising contacting a feedstock of monoolefin having from 3 to 4 carbon atoms per molecule with a catalyst consisting essentially of vanadium tetrachloride in a liquid diluent at a temperature in the range of about 100 to 300° F.

3. A method according to claim 2 wherein said monoolefin is propylene.

4. A method according to claim 2 wherein said monoolefin is butene.

5. A method of preparing a heavy liquid polymer comprising contacting propylene in a liquid polymerization mixture including an inert hydrocarbon diluent with a catalyst consisting essentially of vanadium tetrachloride at a temperature in the range of about 100 to 300° F. and a pressure sufficient to maintain said mixture in the liquid phase, said catalyst being present in an amount of about 0.5 to 5 weight percent of said mixture.

6. A method of polymerizing propylene to a liquid polymer boiling above 400° F. which comprises forming a polymerization mixture of propylene, an inert and nondeleterious liquid hydrocarbon diluent and catalyst consisting essentially of vanadium tetrachloride, the weight ratio of propylene to diluent being in the range of 1:1 to 1:20 and the amount of catalyst being in the range of about 0.5 to 5 weight percent of said mixture, subjecting said mixture to polymerization conditions including a temperature in the range of about 100 to 300° F. and a pressure sufficient to maintain said mixture in a liquid phase, mixing said mixture so as to contact said propylene with said catalyst for a period of about 30 minutes to 10 hours, and recovering said liquid polymer from said mixture.

7. A method of polymerizing propylene to a liquid polymer boiling above 400° F. which comprises forming a polymerization mixture of propylene, an inert and nondeleterious liquid hydrocarbon diluent and catalyst consisting essentially of vanadium tetrachloride, the weight ratio of propylene to diluent being in the range of 1:2 to 1:10 and the amount of catalyst being in the range of about 1 to 3 weight percent of said mixture, subjecting said mixture to polymerization conditions including a temperature in the range of about 150 to 250° F. and a pressure sufficient to maintain said mixture in a liquid phase, mixing said mixture so as to contact said propylene with said catalyst for a period of about 1 to 3 hours, and recovering said liquid polymer from said mixture.

8. A method according to claim 7 wherein said hydrocarbon diluent is a paraffin having 5 to 12 carbon atoms per molecule and the pressure of the reaction is in the range of about 100 to 700 pounds per square inch gauge.

References Cited in the file of this patent
UNITED STATES PATENTS
2,085,535     Langedijk et al. _____ June 29, 1937